United States Patent [19]

Gruette et al.

[11] 3,896,240

[45] July 22, 1975

[54] PREPARATION OF SIMULATED HUMAN MILK

[75] Inventors: Friedrich-Karl Gruette, Caputh; Juergen Schulze, Bergholz-Rehbruecke; Heinz-Georg Hampel, Stendal, all of Germany

[73] Assignee: Akademie der Wissenschaften der DDR, Berlin, Germany

[22] Filed: Apr. 2, 1973

[21] Appl. No.: 347,345

[52] U.S. Cl. ............... 426/271; 426/72; 426/187; 426/189; 426/357; 426/358; 426/801
[51] Int. Cl. ............................................. A23c 11/00
[58] Field of Search .......... 99/57, 63; 426/187, 185, 426/189, 190, 186, 271, 356, 357, 358, 72

[56] References Cited
UNITED STATES PATENTS

| | | | |
|---|---|---|---|
| 3,201,245 | 8/1965 | Clark et al. | 99/57 |
| 3,320,072 | 5/1967 | Clark et al. | 99/57 X |
| 3,369,906 | 2/1968 | Chen | 99/57 X |
| 3,484,356 | 12/1969 | Gousard | 99/57 X |
| 3,649,295 | 3/1972 | Bernhart | 99/57 |

*Primary Examiner*—David M. Naff
*Attorney, Agent, or Firm*—Michael S. Striker

[57] ABSTRACT

A simulated human milk for feeding babies is prepared by treating whey with an anion-exchange resin to remove substantially all anions of weak acids from the whey, adding to the whey a protein produced by pouring a quantity of skim milk into a solution of acid to produce a mixture having a pH between 4.4 and 5.1, adding fats, vitamins and minerals to the protein and whey mixture, homogenizing the resultant mixture and subsequently adding lactose.

5 Claims, No Drawings

PREPARATION OF SIMULATED HUMAN MILK

BACKGROUND OF THE INVENTION

The present invention pertains to a composition that simulates human milk and is particularly adapted for use as a baby food, but also for use by others for the purpose of hindering or suppressing putrefaction attributable to the action of intestinal bacteria, and a process for producing such a simulated human milk composition.

Heretofore synthetic baby food compositions have been prepared from cow's milk, as well as from milks of other animals or plants, by the addition thereto of various vegetable oils, vitamins, minerals, and similar essential nutrients.

The purpose of such synthetic baby food compositions has been to permit feeding of a baby to continue when its nurse or mother has a dry period or to compensate for inadequate quantities of human milk. For the latter purpose baby foods were formulated whose compositions approached more and more closely to that of human milk. Moreover, baby foods were formulated by adding thereto specific factors, such as the bifidus factors, which compositions had aimed at imitating the specific effectiveness of human milk. These so-called bifidus factors are growth factors and are meant to cause a predominant occurrence of the bacterium Lactobacillum bifidus in the intestinal tract of artificially fed babies.

It has been known for more than 10 years that this so-called bifidus occurs in babies at birth in the large intestine and continues to occur therein without significant change in amount, even when the feeding is changed from human milk to synthetic baby foods. The addition of such a bifidus factor does not result in a significant improvement of the synthetic baby food. Nor does the preliminary souring of the milk produce any evident result. The desired characteristic of easy digestibility that is typical of human milk already is attained by means of technical operations, such as spray-drying or drum-drying by means of heated rolls; the present invention.

It is further recognized that the effectiveness of synthetic baby food compositions can be improved by the addition of $\beta$-lactose. The addition of $\beta$-lactose is based upon the assumption that the $\beta$-lactose, until the composition is used, retains its original stereoisomeric form, and thereby provides a microbiological and biochemical environment in the large intestine of infants in the same manner as human milk. However, such compositions have the disadvantage that they must be dissolved in water immediately before feeding and not any earlier. On solution in water a spontaneous optical rotation or mutaratation of the $\beta$-lactose to $\alpha$-lactose occurs, the lactose is reabsorbed and consequently does not then pass into the segments of the lower intestine. This isomerization is accelerated by heat, for example, when the dry powdered milk composition is reconstituted with water. Preparation or storage of such liquid compositions containing $\beta$-lactose prior to use is accordingly pointless. Furthermore, $\beta$-lactose is relatively costly, which is another obstacle to its extensive use in infant food compositions.

SUMMARY OF THE INVENTION

The principal object of the present invention is to provide a composition that simulates human milk which is especially suitable for the feeding of babies and which is equivalent in its microbiological and biochemical effectiveness to human milk and does not have disadvantages of prior compositions for this purpose, and processes of producing the same.

It is a further object of the present invention to provide such a composition which can be dispensed as a dry powder and be reconstituted with water and which, when freshly prepared or reconstituted with water, can be stored without loss of its effectiveness.

It is a further object of the present invention to provide such a composition containing lactose in the form of its equilibrium mixture instead of $\beta$-lactose which is occasionally used in such compositions, and processes of preparing such composition.

Other objects and advantages of the invention, some of which are specifically referred to hereinafter, will be apparent to those skilled in the art to which it pertains.

DESCRIPTION OF THE PREFERRED EMBODIMENTS

The present invention is based upon the discovery of a simulated human milk composition equivalent in its microbiological and biochemical effectiveness to human milk, which does not have disadvantages of prior compositions of this type, and processes for preparing such compositions. For example, the compositions of the present invention have the desirable advantage of being able to be reconstituted with water and stored as liquids prior to use.

In accordance with the present invention, the simulated human milk composition is prepared from a liquid preferably whey from which anions of weak acids had previously been removed. The composition also contains a protein such as can be prepared by precipitation from a protein containing liquid such as, say, skimmed milk at its isoelectric point, which is at a pH between 4.4 and 5.1, together with fats, vitamins and minerals. This liquid mixture is then homogenized and lactose is added thereto in an amount between 6 and 8 percent by weight of the mixture. Optionally, further nutriments, especially further carbohydrates, may also be added thereto.

Whey is the serum or watery part of milk and contains sugar, minerals and lactalbumin. The thick or more coagulable part of milk is the curd. In cheese making, to separate the curd from the whey, the curd is normally first precipitated by addition of an acid or by action of an enzyme.

In preparing the casein, for example, from skimmed milk, that is, cow's milk from which the cream has been separated, water is added thereto in any desired ratio, preferably 1 : 1 by volume, and the pH is so adjusted with a suitable acid, preferably hydrochloric acid, that the combined mixture of milk and water has a pH between 4.4 and 5.1, and preferably 4.7, which range includes the isoelectric point of the casein. Coagulation or precipitation of the casein generally occurs at the isoelectric point. The thus coagulated casein is separated by filtration or other means and washed with water, at least once and preferably several times. and preferably several times. After the subsequent redissolving of the casein by a corresponding change of the pH, the process can, with advantage, be repeated several times.

The anions of weak acids, such as phosphate, citrate, or acetate anions, must be removed from the whey before the various other ingredients of the composition are added to and mixed therewith. When the whey of cow's milk is used as the starting material, the whey must be preliminarity treated with an anion-exchanger.

Proteins obtained from cow's milk and the milks of animals other than cows, proteins obtained from the whey of such milks, egg white, proteins produced by microbial fermentations, vegetable proteins, and synthetic may all be used instead of the proteins from skimmed cow's milk or the proteins from cow's milk whey in the compositions of the present invention.

As the fat component of the compositions of the present invention, butter, suitably in admixtures with vegetable oils such as sunflower-seed and cottonseed oils, may also be included.

The vitamins and minerals that are used in the compositions may be supplemented by the addition of other vitamins and minerals in amounts based upon established normal requirements of each.

Lactose that is used in the compositions of the present invention is the commercially available equilibrium mixture consisting of 2 parts of $\alpha$-lactose to 3 parts of $\beta$-lactose is added in powdered form in an amount between 6 and 8 percent by weight of the finished composition. If necessary, to complete the preselected carbohydrate content of the composition, carbohydrates such as sucrose and starches may also be added. These carbohydrates are not added however until the mixture of the other specified ingredients has been homogenized and dried, for example, by spray-drying. After the drying process the mixture, in the form of granules or powder, can easily be mixed with the particles of the carbohydrate.

The simulated milk composition of the present invention resembles human milk in its general characteristics. Thus, it exhibits the same microbiological effects as human milk and is accordingly, usable as a novel prepared baby food of high quality, as well as for other uses. Illnesses of babies that are directly or indirectly attributable to feeding can be considerably reduced and the infant mortality rate consequently also be reduced by using the simulated milk compositions of the present invention.

Furthermore, the compositions of the present invention can be ingested by those who seek to hinder or suppress putrefaction or fermentation by intestinal flora, that is, those who wish to relieve and protect themselves from the products of intestinal putrefaction and thereby improve their health.

The present invention is further described in the Example that follows:

EXAMPLE

The simulated human milk composition of this example is prepared from whey from cow's milk which has been freed from anions of weak acids by treatment with a suitable anion-exchange material, for example, an anion-exchange resin (such as Wofatit SBK) that has been charged with chloride ions. The thus-treated whey is diluted with water to three times its original volume and to it is then added milk protein in the form of a wet precipitate that was obtained by pouring skimmed milk in a watery precipitation bath which, by means of hydrochloric acid, had been adjusted to such a pH as guarantees the reaching of the isoelectric point of casein at the point of the complete adding of the milk in the precipitation bath so that the pH was between 4.4 and 5.1 and preferably 4.7. Such an amount of the thus-precipitated milk protein is added that it constitutes 1.7 percent by weight of the final simulated human milk composition.

To the whey containing milk protein are then added, as fatty components, a mixture of 2 parts by weight of sunflower-seed oil and 1 part by weight of cottonseed oil in an amount such that the final composition contains 3.5 percent by weight of the mixture.

Vitamins A, $B_1$ (thiamin), $B_2$ (riboflavin), $B_6$ (pyridoxine), and C (ascorbic acid) and nicotinamide, as well as ferrous lactate, in amounts based upon established normal requirements thereof, are also added to the composition.

After addition of the protein, fats, and vitamins, the composition is homogenized and dried by spraying. Commercial lactose (equilibrium mixture) in the form of powder and starch are then added to the spray-dried powder and mixed therewith in amounts such that the final composition when reconstituted for drinking by the addition of water contains 6 percent by weight of lactose and 2 percent by weight of wheat starch.

The simulated human milk composition of this example when reconstituted and prepared for drinking has a caloric value of 69 kilogram calories per 100 milliliters and includes the following principal components in the specified percentages by weight:

| | |
|---|---|
| Protein | 1.7 |
| Fats | 3.5 |
| Carbohydrates | 8.0 |
| Minerals | 0.3 |
| Total solids | 13.5 |

Although the composition of the present invention may be dispensed as a liquid it will generally be preferred to dispense it in the form of a powder from which the liquid composition can be reconstituted by the addition of water.

Inasmuch as the foregoing description comprises preferred embodiments of the invention which were selected solely for purposes of illustration, it is to be understood that modifications and variations may be made as described therein without departing from the invention, whose scope is to be understood to be limited only by the appended claims.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of a composition that simulates human milk and which is especially suitable for the feeding of infants which comprises
   a. treating whey with an anion-exchange resin charged with chloride ions to remove substantially all anions of weak acids from the said whey,
   b. adding to the said treated whey a protein produced by pouring a preselected quantity of skim milk into a preselected quantity of an aqueous solution of hydrochloric acid containing only such an amount of hydrochloric acid that upon addition of the preselected quantity of the skim milk to the aqueous solution of hydrochloric acid the hydrogen-ion concentration of the resulting mixture corresponds to a pH between 4.4 and 5.1, c. adding fats, vitamins, and minerals to the resulting mixture of protein and treated whey, d. homogenizing the resulting mixture, and e. subsequently adding lactose to the resulting homogenized mixture in an amount between 6 and 8% by weight of the mixture.

2. A process as defined in claim 1 in which the protein in step b was produced by pouring the skim milk into an aqueous solution of hydrochloric acid containing only such an amount of hydrochloric acid as to produce a mixture having a hydrogen-ion concentration corresponding to pH of 4.7 upon the addition of the skim milk thereto.

3. A process as defined in claim 1 in which the mixture after the homogenization step d is dried to a powder and the lactose is subsequently mixed therewith.

4. A process as defined in claim 1 in which the protein is produced from skim cow's milk.

5. A process as defined in claim 1 in which the protein and fat are added to the mixture in amounts equivalent to approximately 1.7 and 3.5%, respectively, by weight of the final liquid composition.

* * * * *